United States Patent [19]
Hickman

[11] 3,768,826
[45] Oct. 30, 1973

[54] TANDEM WHEEL SPRING SUSPENSION
[75] Inventor: Albert F. Hickman, Eden, N.Y.
[73] Assignee: Hickman Developments, Inc., Eden, N.Y.
[22] Filed: Nov. 9, 1971
[21] Appl. No.: 197,078

[52] U.S. Cl........ 280/104.5 R, 267/21 R, 267/63 R, 267/57.1 R
[51] Int. Cl............................................. B60g 11/22
[58] Field of Search.............. 280/104.5 R, 104.5 A, 280/104.5 B; 267/21 R, 21 A, 57.1 R, 57.1 A, 63 R, 63 A

[56] References Cited
UNITED STATES PATENTS
| | | | |
|---|---|---|---|
| 3,410,573 | 11/1968 | Hickman | 280/104.5 R |
| 2,828,958 | 4/1958 | Hirst | 267/21 A |
| 3,017,195 | 1/1962 | Hickman | 267/63 A |
| 2,893,570 | 7/1959 | Mulcahy | 267/63 A |
| 3,677,535 | 8/1970 | Beck | 267/63 |

*Primary Examiner*—Philip Goodman
*Assistant Examiner*—John A. Carroll
*Attorney*—Harold I. Popp

[57] ABSTRACT

Each of two or more tandem wheels are connected to one side of the vehicle frame by a hub structure journalled on the frame and having a fixed, radially projecting arm to the opposite end of which the corresponding tandem wheel is journalled. Compensating levers are severally fixed to project radially from these hub structures generally toward each other with their ends arranged above one another. The present improvement resides in providing resilient support for the vehicle frame on the wheels in the form of rectilinear movement shear rubber springs.

10 Claims, 15 Drawing Figures

Patented Oct. 30, 1973

INVENTOR.
Albert F. Hickman
BY
Harold I. Popp
ATTORNEY.

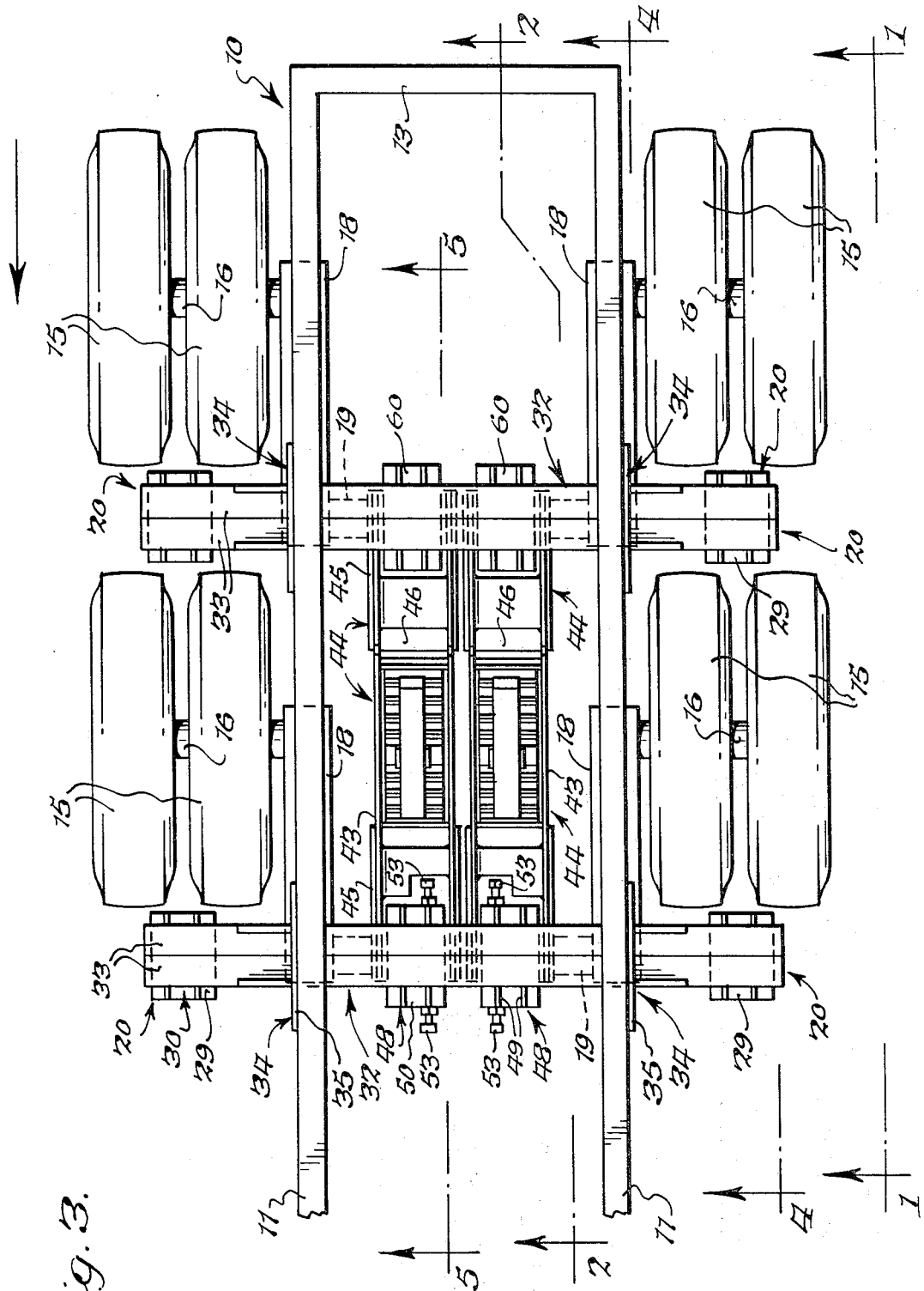

Patented Oct. 30, 1973
3,768,826
6 Sheets-Sheet 3
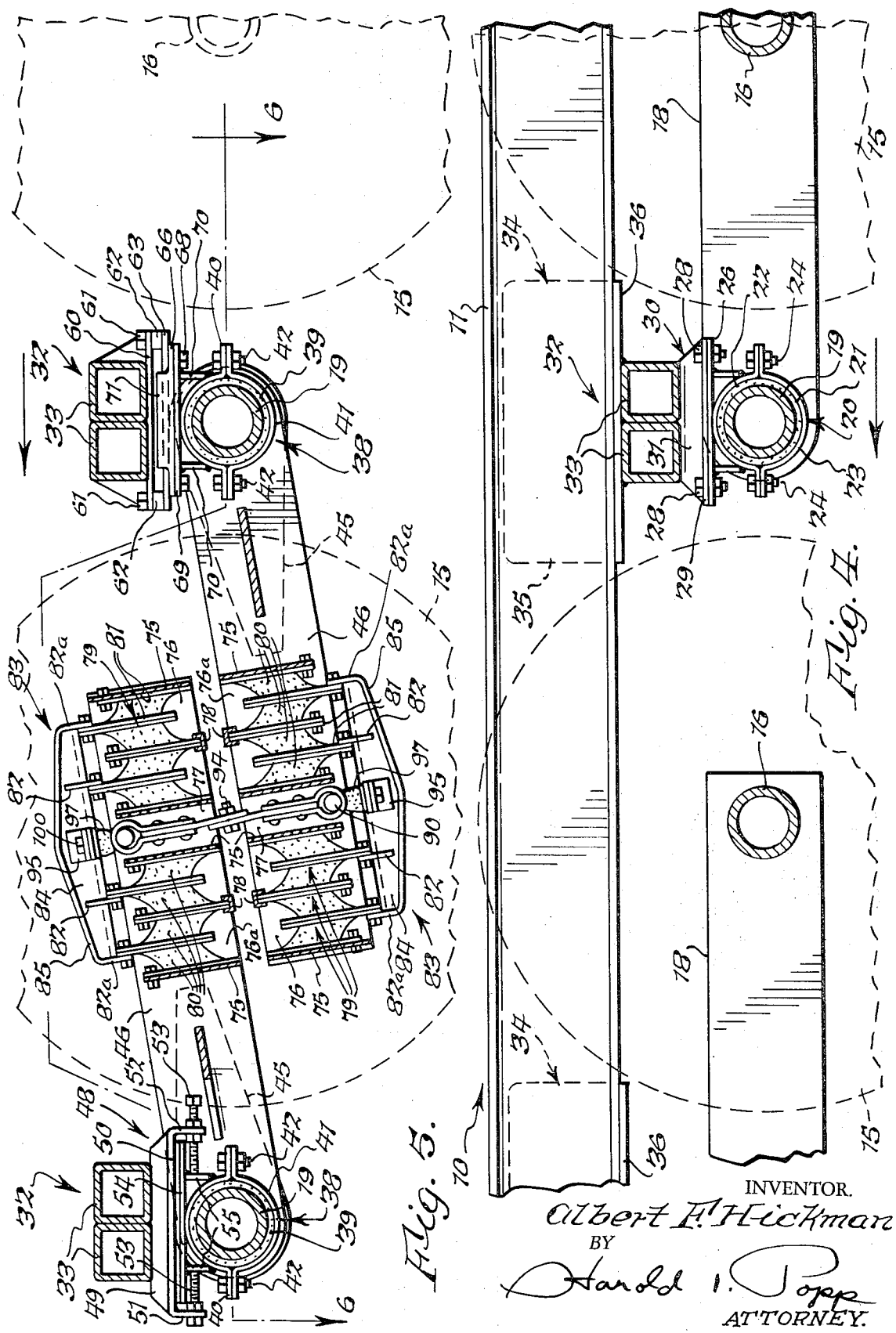
INVENTOR.
Albert F. Hickman
BY
Harold I. Popp
ATTORNEY.

Patented Oct. 30, 1973
3,768,826
6 Sheets-Sheet 4
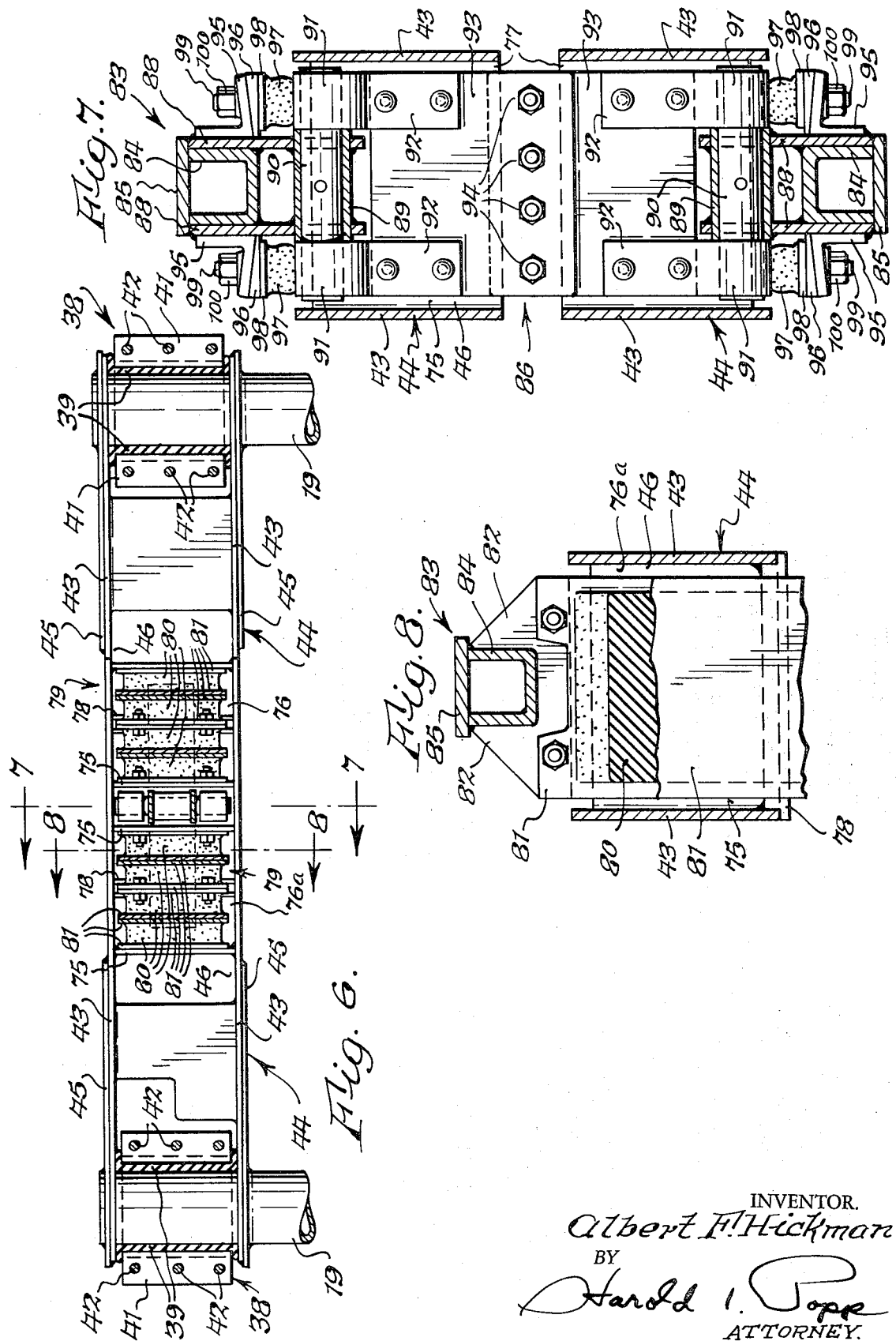

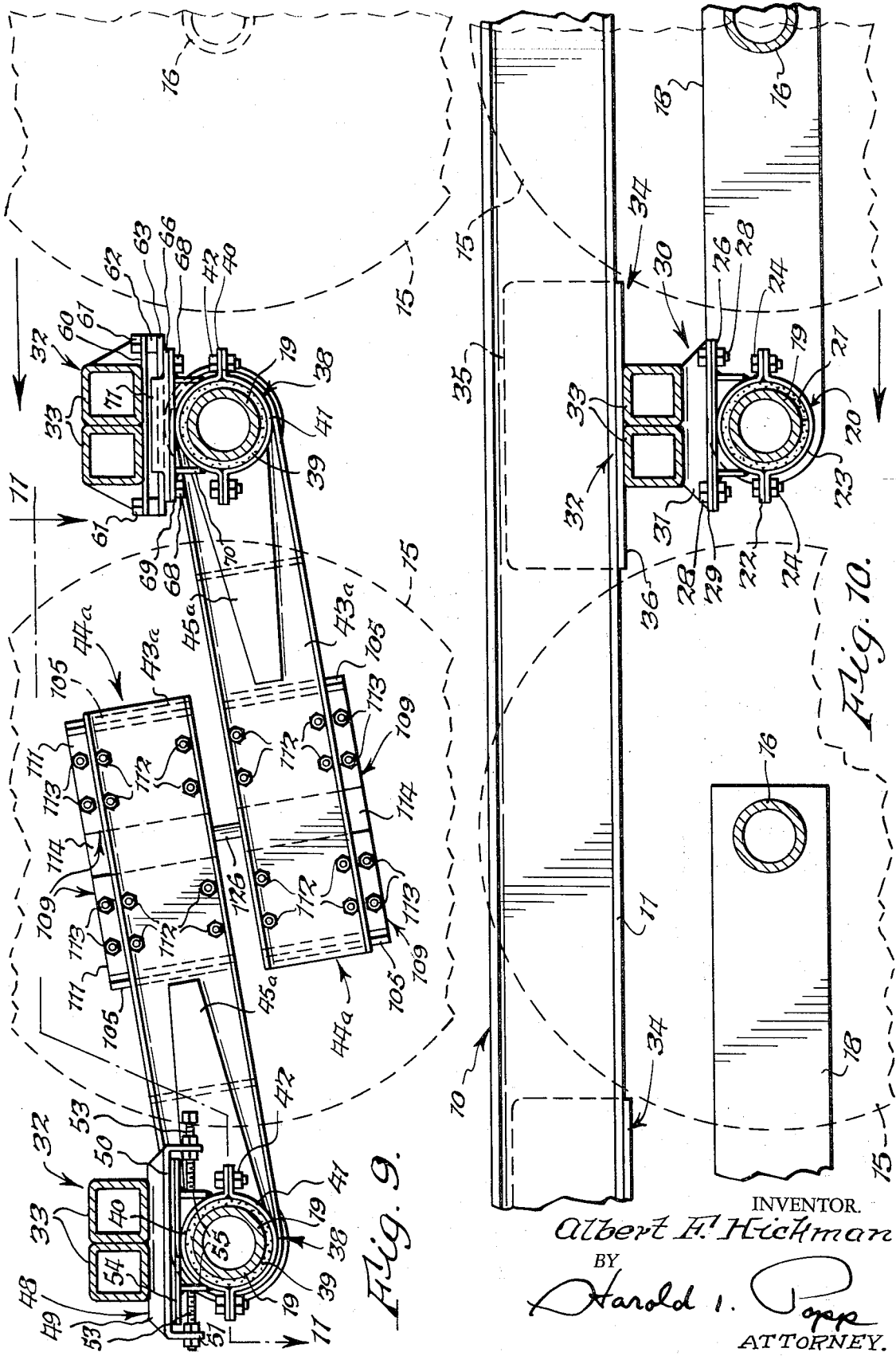

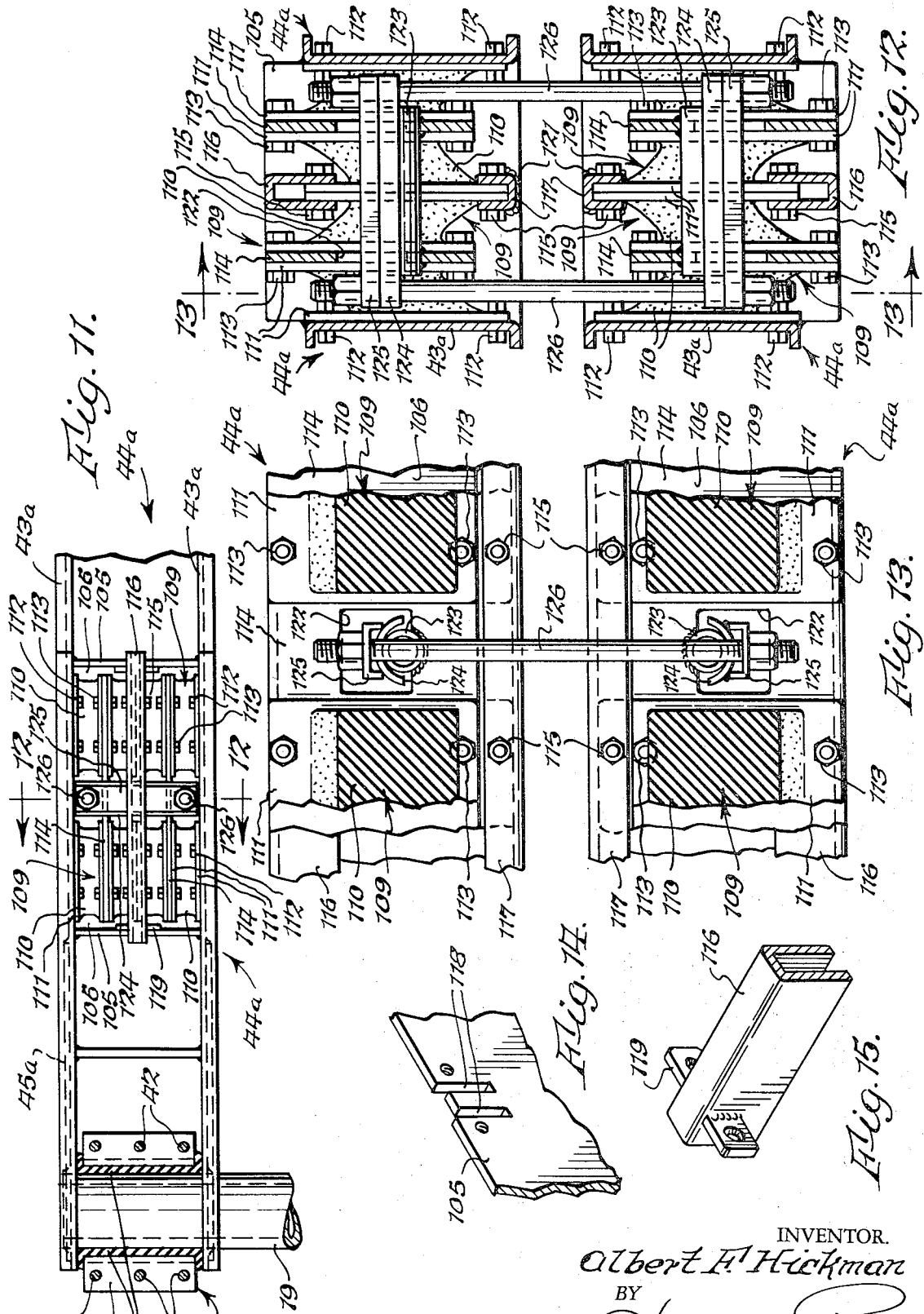

TANDEM WHEEL SPRING SUSPENSION

It is, therefore, the principal object of the invention to provide such an independent wheel tandem suspension in which resilient support for the frame is in the form of rectilinear movement shear rubber springs or sandwiches.

Another object is to so nest the rectilinear movement shear rubber spring as to provide the necessary clearance for the frame, road, and other parts of the suspension, as well as the drive and running gear.

Another object is to pack in enough rubber, and in such manner, to provide adequate capacity of resilient resistance in the very limited and unusual space available.

Another object is to provide such rectilinear movement shear rubber springs or sandwiches in such groups and numbers as to supply substantially the entire resilient support for even very heavy duty tandem wheel highway and off highway vehicles.

Another object is to provide such a suspension in which the rubber springs are protected against injury and are out of sight from the sides of the vehicle.

Other objects and advantages of the invention will be apparent from the following description and drawings in which:

FIG. 3 is a fragmentary top plan view of the rear of the frame and the two tandem wheel suspension shown in FIGS. 1 and 2.

FIGS. 4 and 5 are enlarged fragmentary vertical longitudinal sectional views taken generally on the correspondingly numbered line, FIG. 3.

FIG. 6 is a fragmetnary generally horizontal section taken generally on line 6 — 6, FIG. 5.

FIGS. 7 and 8 are further enlarged vertical sections taken on the correspondingly numbered lines, FIG. 6.

FIG. 9 is a view similar to FIG. 5 showing a modified form of the invention in which the rubber sandwiches are arranged transversely of the compensating levers which they connect.

FIG. 10 is a view similar to FIG. 4, of this modified form.

FIG. 11 is a fragmentary view similar to FIG. 6, of this modification.

FIG. 12 is an enlarged vertical section taken generally on line 12 — 12, FIG. 11.

FIG. 13 is a fragmentary vertical section taken generally on line 13 — 13, FIG. 12.

FIGS. 14 and 15 are fragmentary perspective views of certain parts of the modified form of the invention illustrated in FIGS. 9 - 15.

THE VEHICLE FRAME, WHEELS AND COMPENSATING LEVER STRUCTURE, ALL FIGURES

Figure 1:
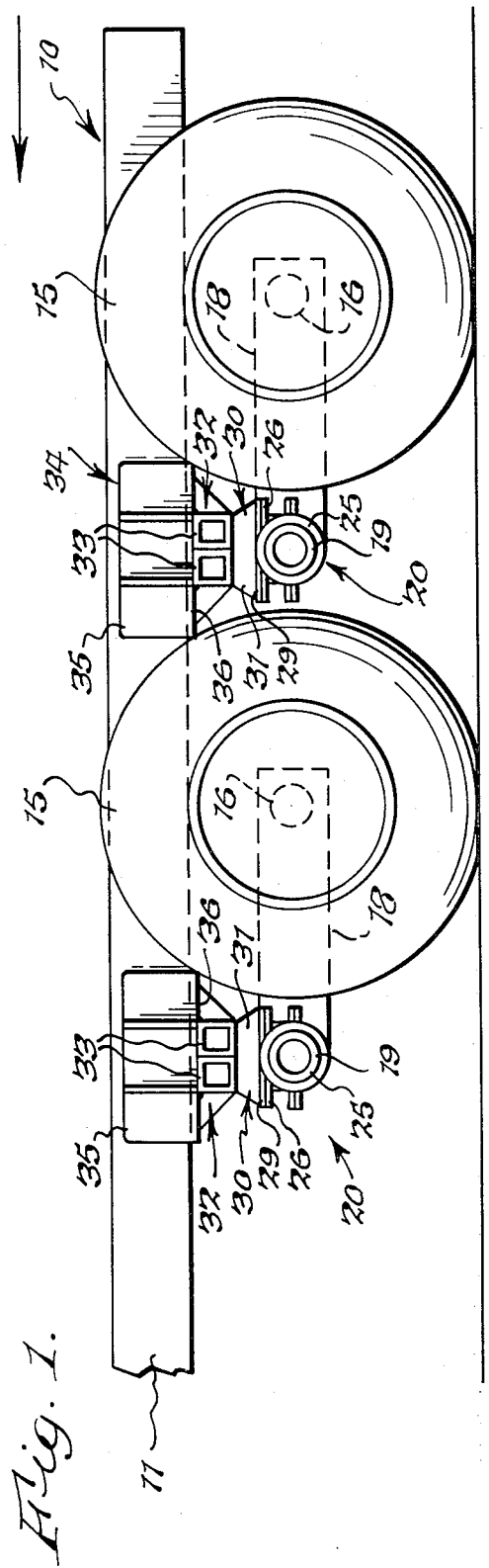
FIG. 1 is a fragmentary side elevational view of the rear end of an unloaded vehicle frame supported at each side by a two tandem wheel suspension embodying the present invention, parts being omitted for clarity, this view being taken on line 1 — 1, FIG. 3. In this and other views, the direction of vehicle travel is indicated by a large overhead arrow.

The main frame 10 of the vehicle can be of any suitable construction and is shown as comprising a pair of main longitudinal side frame bars 11 in the form of inwardly facing straight and parallel channels connected at their rear ends by an inwardly facing cross channel bar 13.

Both forms of the invention are shown as supported by wheels 15, these wheels being shown in the form of dual tired wheels, that is, pairs of rim structures bolted together side-by-side and each pair of rim structures being journalled on a stub axle 16 in any suitable manner (not shown), these stub axles extending horizontally and transversely of the line of vehicle travel and the stub axles 16 at opposite sides of the vehicle being normally arranged, in pairs, axially in line with each other as best shown in FIG. 3. Each stub axle is welded or otherwise fixed to the outboard end of an arm 18, this being the rear end of the arm with reference to the line of vehicle travel. Each such arm 18 can be of any suitable form but is shown as being of rectangular tubular form in cross section with its stub axle 16 extending therethrough and being welded thereto. The inboard or forward end of each arm 18, with reference to the line of vehicle travel, is welded to a horizontal hub structure in the form of a cross shaft 19. Each cross shaft is shown in the form of a round tubular cross shaft extending transversely of the line of vehicle travel and as being arranged parallel with its stub axle 16 and the axis of its wheel.

The outer end of each hub structure or tubular cross shaft 19 is journalled in a bearing 20 which is preferably in the form of a rubber bushed bearing. As best shown in FIG. 4, each of these bearings comprises a rubber bushing 21 surrounding and held in compressive relation with the other end of its tubular cross shaft 19 by metal half bearing housings 22 and 23, these half bearing housings being drawn together to compress the rubber bushing 21 by bolts 24. The ends of each rubber bushing abut against abutment rings 25 welded to the companion cross shaft 19, such as shown in FIG. 1. Each top half bearing housing 22 is provided with a horizontal top plate 26 welded thereto and which is bolted, as by bolts 28, to the bottom plate 29 of a U-shaped spacer block 30. The upstanding legs 31 of each spacer block 30 are welded to the underside of a tubular cross bolster 32 formed by a pair of identical tubes 33 of rectangular form in cross section arranged side-by-side and welded to each other. Each bolster 32 extends under both main longitudinal side frame bars 11 of the vehicle frame 10 and is secured at each end to the corresponding main longitudinal side frame bar 11 by a frame bracket 34. Each frame bracket 34 comprises a vertical plate 35 secured in any suitable manner to the outside of each main longitudinal side frame bar 11 and having a horizontal flange 36 underlying this main longitudinal side frame bar and overlaying the cross bolster 32, as best shown in FIGS. 1, 2, 3 and 5.

The inner end of each hub structure or tubular cross shaft 19 is connected to the corresponding cross bolster 32 by a bearing 38 which is also preferably a rubber bushed bearing. As best shown in FIGS. 5 and 6, each bearing 38 comprises a rubber bushing 39 surrounding and held in compressive relation with the inner end of the corresponding tubular cross shaft 19 by a pair of metal half bearing housings 40, 41, these half bearing housings being drawn into compressive relation with the rubber bushings 39 by bolts 42. As best shown in FIG. 6, the opposite ends of each rubber bushing 39 protrudes beyond its half bearing housings and abuts against the spaced longitudinal side plates 43 of compensating levers 44, which side plates are apertured at their longer ends to fit around the ends of the cross shafts 19. These apertured larger ends of the side plates 43 have longitudinal reinforcing plates 45 welded to their exterior faces and having larger ring ends which embrace and are welded to the corresponding cross shaft 19. In FIGS. 9 – 15, these compensating levers and their side plates, are designated as 44a and 43a respectively, because of a slight difference in their form.

An important feature of the invention resides in the spacing of the pair of side plates 43 of each pair of compensating levers to provide a compartment 46 for the corresponding group of rectilinear movement shear rubber sandwiches which provide resilient support for the frame 10 on the wheels 15. To so accommodate these groups of rectilinear movement shear rubber sandwiches and their movement, and to permit of their being interconnected, all as hereinafter described, these compartments 46 in each compensating lever 44 are preferably open both at the top and at the bottom.

Figure 2:
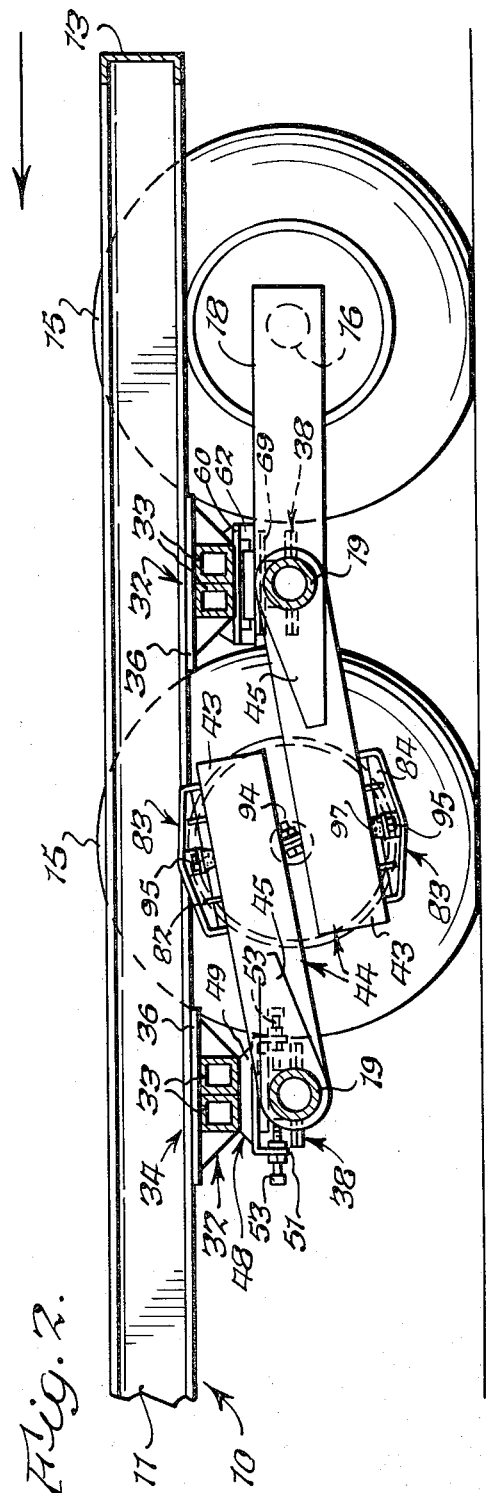
FIG. 2 is a fragmentary longitudinal section thereof taken generally on line 2 — 2, FIG. 3.

The upper half bearing housing 40 for the bearing 38 supported by the inner end of each front cross shaft 19 (with reference to the direction of vehicle travel) is secured to the corresponding front bolster 32 as follows:

The numeral 48 represents a U-shaped metal spacer block above each forward bearing 38 and the upstanding legs 49 of which are welded to the underside of the front cross bolster 32 as best shown in FIGS. 2, 3 and 5. The horizontal bottom plate 50 of each spacer block 48 has a depending front lip 51 and a rear depending lip 52, these depending lips extending transversely of the line of vehicle travel. Each of these depending lips 51, 52 carries an adjusting screw 53 extending through a threaded hole therein, these adjusting screws extending lengthwise of the line of vehicle travel. Each screw carries a pair of lock nuts to hold it in any adjusted position. These adjusting screws 53 abut against opposite sides of a structure comprising a horizontal plate 54 (FIG. 5) and vertical side plates 55 connected, as by welding, to one another and to the top half bearing housing 40 of the companion front bearing 38. These vertical plates 55 extend lengthwise of the cross shafts 19 and the adjusting screws 53 abut against these plates.

The upper half bearing 40 for the inner end of each rear cross shaft 19 (with reference to the direction of vehicle travel) is secured to the rear bolster 32 of the frame 10 (FIGS. 2, 3, 5 and 9) as follows:

The numeral 60 represents a rectangular horizontal plate welded to the underside of the rear bolster 32 above each of the bearings 38 for the rear hub structures or cross shafts 19. To each plate 60 is secured, as by corner bolts 61 and spacer blocks 62, a rectangular slide plate 63. Each slide plate 63 slides fore-and-aft of the line of vehicle travel on a guide plate 66 secured by bolts 68 to a plate 69 welded, through vertical plates 70, to the top half bearing housing 40 of the corresponding rear bearing 38. Upstanding side flanges 71 are provided, on each side of each guide plate 66, these upstanding flanges extending lengthwise of the line of vehicle travel.

PREFERRED FORM FIGS. 1 – 8.

This form of the invention is characterized by the rectilinear movement, shear rubber sandwiches which are nested in and connected to form spring means between the compensating levers 44, having their working faces arranged transversely of these levers.

For this purpose, each compensating lever 44 is provided with four spaced rectangular metal transverse partitions 75 welded along their vertical edges to the opposing faces of the compensating lever side plates 43. The first of these partitions is across the outboard extremity of its compensating lever and forms with the next succeeding or second partition 75 a rectangular compartment 76 open at its top and bottom. This next succeeding partition is spaced a closer distance from the third partition 75 to form a smaller rectangular compartment 77 also open at its top and bottom. This third partition 75 is spaced from the fourth partition 75 the same distance as the first and second partitions 75 thereby to form a rectangular compartment 76a of the same dimensions as the first compartment 76.

At the center of each compartment 76, 76a, at the edges of the compensating lever side plates 43 opposing the companion lever 44, cross channel bars 78 are welded at their ends to these compensating lever side plates to bridge these compartments. The channel of each of these bars faces towards its compartment so bridged.

Each of the compartments 76, 76a contains four rectilinear movement shear rubber springs 79 each comprising a resilient rubber body 80 having opposite rectangular faces bonded, as by vulcanization, to larger generally rectangular metal plates 81, the rubber bodies, unstressed, being each of parallogram cross section, transversely of its plates 81, so that, when working force is applied, each rubber body first assumes a rectangular cross section and then assumes a parallogram cross sectional form in the opposite direction, as compared with its unstressed state.

In each compartment 76, 76a one metal plate 81 of a first rectilinear movement shear rubber sandwich 80, 81 is bolted to a partition 75; the opposite plate 81 of this first shear rubber sandwich is bolted to the plate 81 of a second shear rubber sandwich; the opposite plate 81 of this second shear rubber sandwich is bolted to the plate 81 of a third shear rubber sandwich; the opposite plate 81 of this third shear rubber sandwich is bolted to the plate 81 of a fourth shear rubber sandwich; and the opposite plate 81 of this fourth shear rubber sandwich is bolted to the other partition forming the chamber 76 or 76a. The shear rubber sandwiches 80, 81 are preferably identical and hence the plates 81 connecting the second and third shear rubber sandwiches 80, 81 in each compartment, 76 or 76a, are at the center of this compartment and aline with the cross channel bar 78 bridging the same. Each of these cross channel bars 78 receives and forms an abutment for these center plates 81 for each compartment 76 and 76a.

In the group of rectilinear movement shear rubber sandwiches 80, 81 in each compartment 76 or 76a, the connected-together rectangular metal plates 81 of the first and second, and of the third and fourth shear rubber sandiwches are the "live" plates, that is, the plates 81 which move the greatest distance in distorting the gang of rubber bodies 80 in the compartment to provide resilient support for the frame 10 on the wheels 15. The four pairs of "live" so connected-together rectangular metal plates 81 in the compartment 76, 76a of each compensating lever 44 are also bolted to transverse fins or protruding cross vanes 82, 82a of a metal yoke 83, this yoke comprising an arching metal channel 84 to which the transverse fins or vanes 82 are welded and a metal strap 85 welded to the arching side walls of the channel 84 and the ends of which form the end transverse fins or protruding end vanes 82a, as best shown in FIGS. 5 and 8, Each pair of compensating levers 44 has a pair of arching yokes 83 arranged in line with the pair of its compartments, 76, 76a, each yoke being arranged at the side of its compensating lever remote from the other lever and each pair of these arching yokes are connected together by a link 86. To this end a pair of upright plates 88 are welded to the exterior faces of the side walls of the channel 84 of each yoke 83 and project toward the center compartment 77, as best shown in FIG. 7. A cross tube 89 extends through and is welded to the projecting ends of each pair of these upright plates 88. A cross pin 90 is pinned in each of these cross tubes and projects from opposite ends thereof. Each projecting end of each pin 90 is embraced by the oversize eye or knuckle 91 of a U-shaped strap, the legs 92 of which project into the corresponding compartment 77 to straddle a straight strap 93 which projects from this compartment 77 into the space between the companion pair of compensating levers 44, as best shown in FIGS. 5 and 7. These opposing projecting ends of each pair of these straight straps are bolted together, as indicated at 94.

The oversize knuckles 91, on rebound action of the compensating levers 44, would, if not restrained, jump away from their cross pins 90 and rattle. To avoid this, metal angles 95 (FIGS. 5 and 7) are welded to the center plates 88 of the arching channel 84 of each yoke 83. The protruding flange of each angle 95 preferably inclines outwardly away from the axis of the cross pin 90. Metal wedges 96 and rubber cushions 97 are interposed between the protruding flanges of the angles 95 and knuckles 91, each rubber cushion being vulcanized to a base plate 98 from which a stud bolt 99 projects through the companion wedge 96 and projecting flange of angle 95, a nut 100 on this stud bolt securing these parts together. The rubber cushions 97 are under initial compression to press the knuckles 91 against the pin end 90 at all times, and the wedges 96 provide this initial compression by being driven into place before the nuts 100 are tightened.

OPERATION — FIGS. 1 – 8

The direction of movement of the vehicle is shown by large arrows over FIGS. 1 – 3, and in the operation of the suspension shown in FIGS. 1 – 8, the upward movement of, say, either front tandem wheel 15 and its stub axle 16, as caused by a bump in the road, effects a corresponding upward movement of its wheel arm 18 and counterclockwise movement (as viewed in FIGS. 1, 2 and 4) of the hub structure or tubular cross shaft 19 forming the hub of this wheel arm 18, such movement being permitted by the rubber bushings 21 and 39 of the frame bearings 20 and 38 for this front wheel hub structure. This angular counterclockwise movement of the hub structure or tubular cross shaft 19 of the front tandem wheel 15 is transmitted directly to the companion compensating lever 44 fixed to project rearwardly from this front cross shaft 19 so as to cause an upward movement of the rear end of this front tandem wheel compensating lever 44.

Such upward movement of the compensating lever 44 of either front tandem wheel 15, as will be seen from FIG. 5, will cause its cross partitions 75, and the rubber sandwich plates 81 bolted thereto, to rise and push upwardly against the rubber bodies 80 vulcanized to these plates 81 thereby not only to cause the rubber bodies 80 so vulcanized thereto to yield, but also push against the opposite plates 81 of these shear rubber sandwiches and which are bolted to the protruding fins or vanes 82, 82a of the upper yoke 83. Such upward movement of either compensating lever 44 of the front tandem wheel 15 will cause its cross channel bars 78, bridging the centers of its compartments 76, 76a, to push against the connected plates 81 at the center of each of these compartments. These center plates in each compartment 76, 76a, in turn, push against their rubber bodies 80 which not only yield, but also push against the opposite plates 81 of these shear rubber sandwiches and which opposite plates are bolted to the protruding fins or vanes 82, 82a of the upper yoke 83.

The upper yoke 82 is thereby resiliently pushed upwardly through the medium of the two groups of shear rubber sandwiches 80, 81 housed in the compartments 76, 76a of the upper compensating lever 44. This causes upward movement (FIGS. 5 and 7) of the upper yoke's small depending center plates 88, cross tube 89, cross pin 90, oversize knuckles 91 of straps 92, and the top strap 93 housed in the compartment of the upper yoke. This pulls up the strap 93 of the bottom yoke 83 thereby to effect upward movement, in series, of the following parts of the bottom yoke 83: strap 93, straps 92 and their oversize knuckles 91, cross pin 90, cross tube 89, projecting center plates 88, arching channel 84, and upwardly projecting fins or ribs 82, 82a.

This pushes upwardly the four pairs of rubber sandwich plates 81 bolted to these fins or ribs 82, 82a, two pairs in each compartment 76, 76a of the lower compensating lever 44. This upward movement of these plates 81 is transmitted to the rubber bodies 80 of the lower compensating lever 44, these, in turn, transmitting this movement (1) to the shear rubber sandwich plates 81 bolted to the partitions 75 of the lower compensating lever 44, and (2) to the channel bars 78 extending centrally across the centers of the compartments 76, 76a of the bottom compensating lever 44. Therefore this movement is transmitted, through the eight rubber bodies 80 of the lower compensating lever 44 to this compensating lever to effect clockwise rotation thereof, together with its hub structure or cross tube 19.

Clockwise rotation of the latter is transmitted to the wheel arm 18 of the rear tandem wheel 15, thereby to effect sharing of the load caused by the assumed upward movement of either front tandem wheel with the companion rear tandem wheel.

Conversely, the upward movement of either rear tandem wheel 15, its stub axle 16 and wheel arm 18, (as viewed in FIGS. 1, 2 and 4) effects a corresponding counterclockwise movement of the hub structure or tubular cross shaft 19 forming the hub of this wheel arm 18, such movement being permitted by the rubber bushings 21 and 39 of the frame bearings 29 and 38 for this rear tandem wheel hub structure 19. This angular counterclockwise movement of the tubular cross shaft 19 for this rear tandem wheel 15 is transmitted directly to the bottom compensating lever 44 fixed to project forwardly from this cross shaft 19 so as to cause a downward movement of the front end of this rear tandem wheel compensating lever 44, and away from the companion lever 44 thereabove.

In reverse order to that just described, this downward force of the compensating lever 44 for the rear tandem wheel 15 is transmitted through the cross partitions 75 and channel cross bars 78 to the rectilinear movement shear rubber sandwiches 80, 81 of the rear tandem wheel 15 or bottom compensating lever 44 to the bottom yoke 83. This downward force is then transmitted via the cross pin 90, lower knuckle 91, lower and upper straps 92, upper knuckle 91, cross pin 90, and upper yoke 83 and its projecting fins or vanes 82, 82a to the groups of connected rubber sandwich plates 81 connected to these projecting fins or vanes of the upper yoke 83. This downward force is then transmitted through the upper rubber bodies 80 to the plates 81 vulcanized to the opposite sides thereof which, in turn, transmit this downward force to the cross partitions 75 and cross angle bars 78 of the top compensating lever 44 serving the front tandem wheel 15. This downward movement of the upper compensating lever 44 effects clockwise movement of the front hub structure of cross shaft 19 to impose a downward force on the front wheel arm 18 and front tandem wheel 15.

The suspension is self-steering, that is, in rounding a curve the stub axles 16 of the rear tandem wheels 15 will assume such angles in a horizontal plate with reference to the fixed stub axles 16 of the front tandem wheels 15 as will enable all of the wheels to round the curve without tire scuffing. This self-steering is effected by the flat surfaced sliding bearing plates 63 and 66 interposed between the inner bearings 38 for the rear tandem wheels 15 and the frame 10 so as to permit limited fore-and-aft movement of the inner or adjacent ends of the rear cross shafts 19. Thus, referring to FIG. 3, in rounding a curve, say, to the right, the rear pair of tandem wheels 15 will be drawn to the right (with reference to the frame 10), by the swinging of the rear end of the frame 10 to the left, through their frictional engagement with the roadway, in order to avoid tire scuffing in rounding the curve. If this force against the tires were resisted, tire scuffing would take place, but such movement to the right of the rear tandem wheels 15 is permitted, the rear tandem wheel stub shafts 16, cross shafts 19 and bearings 38 swinging counterclockwise, as viewed in FIG. 3, about vertical axes intersecting the frame bearings 20 to permit the rear tandem wheels 15 to track properly around the curve without tire scuff. This movement is permitted by the sliding engagement of the horizontal plates 63, 66, the relative movement of which permits the required forward movement of the inner end of the left hand cross shaft 19 and the required rearward movement of the inner end of the right hand end rear cross shaft 19 for this purpose. On returning to the straightaway, the rear pair of rubber tired tandem wheels, again to avoid tire scuff, return to their normal relation shown.

It will be observed that a feature of the invention resides in each group of rubber sandwiches 79 being arranged in a plane extending longitudinally through its compensating lever 44 parallel with the axis of its hub structure 19, since if each group of rubber sandwiches were arranged above or below its compensating lever 44, it would not fit into the limited space between these levers and the road, or between these levers and the body (not shown) on the frame 10, or would require the compensating levers to be spaced an undue distance apart from each other. Desirably, of course, these groups of shear rubber sandwiches 79 are arranged in compartments 76, 76a in the compensating levers 44.

MODIFIED FORM — FIGS. 9 – 15

This form of the invention is distinguished by the working faces and side plates of its rectilinear movement shear rubber sandwiches being arranged lengthwise of the compensating levers which they resiliently connect, and in which they are substantially housed.

Thus each compensating lever 44a is provided with two spaced rectangular metal partitions 105 welded along their vertical edges to the opposing faces of the compensating lever side plates 43a. Each pair of these partitions form a rectangular compartment 106 open at its top and bottom and the major dimension of which is lengthwise of its compensating lever 44a.

Each compartment 106 houses a plurality of rectilinear movement shear rubber springs 109 each comprising a flexible rubber block 110 having opposite rectangular faces bonded, as by vulcanization, to larger generally rectangular metal plates 111, the rubber bodies, unstressed, being each of parallelogram cross section, transversely of its plates 111, so that, when working force is applied, each rubber body first assumes a rectangular cross section and then assumes a parallelogram cross sectional form in the opposite direction, as compared with its unstressed state.

At each end of each compartment 106, one plate 111 of a rubber sandwich 109 is secured by bolts 112 to the inside of the side plate 43a of the compensating lever 44a. The opposite plate 111 of each of these rubber sandwiches 109 so secured, is secured by bolts 113 to one end of an upright, vertically movable metal load transfer plate 114, this plate being arranged at the longitudinal center of its compartment 106 and extending substantially the full length thereof with its opposite vertical end edges close to the partitions 105. These bolt also attach the metal plate 111 of another rubber sandwich 109 to the inner face of the upright, vertically movable metal load transfer plate 114 at each end of the latter. The opposite metal side plate 111 of each of these last mentioned rubber sandwiches 109 are secured to one another by bolts 115 which also secure these side plates 111 within channel bars 116 and 117 extending centrally lengthwise of their compartments 106 and being secured at their opposite ends to the cross partitions 105.

The channel bars 116 are removably so secured at their opposite ends to the centers of their cross partitions 105. For this purpose, each cross partition 105 is notched, as at 118, to receive the companion end of a channel bar 116 and each end of each of these channel bars 116 is provided with a pair of opposite, transversely outwardly projecting ears 119 fitting against the inside or opposing faces of each pair of cross partitions 105 and secured thereto by screws (not shown).

The opposite ends of the channel bars 117 are welded, as at 121, to the centers of the cross partitions 105.

Each upright, vertically movable load transfer plate 114 is provided at its center with a generally rectangular opening 122. The two load transfer plates 114 in each compartment 106 are connected together by a cross tube 123 the opposite ends of which are welded to the lower edges of these rectangular openings 122.

A semicylindrical rocker bar 124 extends lengthwise of and has rolling line engagement with the ouside surface of each of these cross tubes 123. A channel bar 125 extends lengthwise of each semicylindrical rocker bar 124 with its ends projecting beyond the end extremities thereof. The edges of the side walls of each channel bar 125 are held in pressure contact with the convex face of its rocker bar 124 by tie bolts 126. These tie bolts 126 connect the opposite ends of the channel bar 125 in the compensating lever 44a for the front tandem wheel 15 with the opposite ends of the channel bar 125 in the compensating lever 44a for the rear tandem wheel 15.

OPERATION — FIGS. 9 – 15

The direction of movement of the vehicle is shown by large arrows over FIGS. 9 and 10, and in the operation of the suspension shown in FIGS. 9 – 15, the upward movement of, say, either front tandem wheel 15 and its stub axle 16 effects a corresponding upward movement of its wheel arm 18 and counterclockwise movement (as viewed in FIGS. 9 and 10) of the hub structure or tubular cross shaft 19 forming the hub of this wheel arm 18, such movement being permitted by the rubber bushings 21 and 39 of the frame bearings 20 and 38 for this front wheel hub structure. This angular counterclockwise movement of the hub structure or tubular cross shaft 19 of the front tandem wheel 15 is transmitted directly to the compensating lever 44a fixed to project rearwardly from this front cross shaft 19 so as to cause an upward movement of the rear end of this front tandem wheel compensating lever 44a.

Such upward movement of the compensating lever 44a of either front tandem wheel 15, as viewed in FIGS. 9, 12 and 13, will cause upward movement of the plates 111 of the four rectilinear movement shear rubber sandwiches 109 bolted (bolts 112) to the inside faces of the side plates 43a of this front tandem wheel compensating lever 44a. The rubber bodies 110 of these four rubber sandwiches will be stressed upwardly to raise their inner plates 111 bolted (bolts 113) to the two upright, vertically movable load transfer plates 114 housed in the compartment 106 of the front tandem wheel compensating lever 44a.

In addition to the resilient resistance so imposed by the rubber bodies 110 of the four rubber sandwiches 109 so bolted directly (bolts 112) to the inner surfaces of the side plates 43a, the rubber bodies 110 of the center pairs of rubber sandwiches 109 interposed between the pair of upright, vertically movable load transfer plates 114 (bolts 113) and (bolts 115) the channel bars 116 and 117 fixed to the cross partitions 105 also contribute their resilient resistance. These four additional rubber sandwiches in the upper compensating lever 44a are required to provide the spring capacity required to obtain the desirable ride characteristics for a heavy duty truck or trailer suspension.

The upward movement of these two pair of upright, vertically movable load transfer plates 114 in the compensating lever 44a for the front tandem wheel 15, through the cross rods 123 welded to connect the centers of these plates, push upwardly against the upper semicylindrical rocker bar 124 seated on this cross rod 123, this rocker bar providing the required rocking movement as the compensating levers 44a of the front and rear tandem wheels assume different angular relations to each other. This upward movement of the upper rocker bar 124, through the channel bar 125 welded to its upper convex face, draws upwardly on the two tie bolts 126. These pull upwardly, through the channel bar 125, semicylindrical rocker bar 124 and cross rod 123 in the lower compensating lever 44a, the two upright, vertically movable load transfer plates in this lower compensating lever 44a serving a rear tandem wheel 15.

This upward movement of these lower upright vertically movable load transfer plates 114, draws upwardly on the plates 111 of the four rubber sandwiches 109 bolted thereto (bolts 113). This flexes upwardly the rubber bodies 110 vulcanized to these plates 111. This draws upwardly (1) the opposite plates 111 of those rubber bodies 110 bolted (bolts 115) to the longitudinal channel bars 116, 117 fixed at their ends to the cross partitions 105 of the lower compensating lever 44a and (2) the opposite plates 111 of those rubber bodies 110 bolted (bolts 112) to the inner faces of the side plates 43a of the lower compensating lever 44a. These rubber sandwiches 109 of the lower compensating lever 44a serving a rear tandem wheel 15 therefore add their resilient resistance to the rubber sandwiches 109 of the upper compensating lever 44a serving a front tandem wheel 15 when a road bump is encountered by either front tandem wheel 15.

The resulting upward movement of the lower compensating lever 44a serving a rear tandem wheel 15 causes a clockwise oscillation of its hub structure or tubular cross shaft 19 in its rubber bushed frame bearings 20 and 38, thereby to cause a downward movement of the corresponding rear tandem wheel arm 18 and stub axle 16 to cause their rear tandem wheel 15 to share the load or upward movement so imposed on its front tandem wheel by a bump in the road.

Conversely, a bump in the road encountered by either rear tandem wheel 15 and causing an upward movement thereof, will be transmitted, in reverse order to that just described, to the corresponding front tandem wheel 15 so as to cause this front tandem wheel to share the load so imposed on the rear tandem wheel by such a bump in the road.

Again it will be observed that a feature of the invention resides in each group of rubber sandwiches 109 being arranged in a plane extending longitudinally through its compensating lever 44a parallel with the axis of its hub structure 19, since if each group of rubber sandwiches 109 were arranged above or below its compensating lever 44a, it would not fit into the limited spaces between these levers and the road or between these levers and the body (not shown) on the frame 10, or would require the compensating levers 44a to be spaced an undue distance apart from each other. Desirably these groups of shear rubber sandwiches are arranged in the compartments 106 in the compensating levers 44a.

It will also be observed that the load transfer plates 114 in the modified form of FIGS. 9 – 15, and the yoke 83 in the preferred form of FIGS. 1 – 8 each constitutes a member extending lengthwise of each compensating lever 44a or 44 connected to its shear rubber sandwiches 109, 79 and that these members are operatively connected together.

By "rubber" as used in the accompanying claims is meant natural rubber, synthetic rubber, or a mixture thereof, and by "wheel" is meant the ground engaging means 15 whether in the form of a single wheel or the dual wheels shown.

I claim:

1. A vehicle spring suspension adapted to be interposed between a vehicle frame and a pair of tandem rubber tired wheels arranged on in advance of the other at at least one side of the frame, and the suspension having a generally horizontal hub structure associated with each wheel and journalled on said frame to extend transversely of the line of vehicle travel, an arm fixed at one end to each hub structure and projecting radially therefrom, a stub axle fixed to each arm remote from its hub structure and forming a journal for the corresponding wheel, and a compensating lever fixed at one end to each hub structure and projecting radially therefrom with the other end of one of said compensating levers being arranged above the other end of the other of said compensating levers, each of said compensating levers having spaced side plates; wherein the improvement comprises upright partitions connecting said side plates of each compensating lever and providing two compartments in each, and said compartments of the two compensating levers being arranged one above the other and having open sides facing one another and also having open sides remote from said first mentioned open sides, at least one group of rectilinear movement shear rubber sandwiches associated with each compensating lever, each sandwich comprising a resilient rubber body and rigid plates bonded to opposite faces of the rubber body, each group being housed in each compartment in a plane extending longitudinally through its compensating lever parallel with the axis of its hub structure, means connecting a first plate of each rubber sandwich of each group to its compensating lever, means including a yoke connected with the second late of each rubber sandwich in the two compartments of each compensating lever, and means connecting the two yokes together to provide a load transfer means between the two compensating levers, said groups of rubber sandwiches being capable of moving through all said open sides of said compensating levers in acting to provide resilient support for said frame on said wheels.

2. A vehicle spring suspension adapted to be interposed between a vehicle frame and a pair of tendem rubber tired wheels arranged one in advance of the other at at least one side of the frame, and the suspension having a generally horizontal hub structure associated with each wheel and journalled on said frame to extend transversely of the line of vehicle travel, an arm fixed at one end to each hub structure and projecting radially therefrom, a stub axle fixed to each arm remote from its hub structure and forming a journal for the corresponding wheel, and a compensating lever fixed at one end to each hub structure and projecting radially therefrom with the other end of one of said compensating levers being arranged above the other end of the other of said compensating levers; wherein the improvement comprises at least one group of rectilinear movement shear rubber sandwiches associated with each compensating lever, each sandwich comprising a resilient rubber body and rigid plates bonded to opposite faces of the rubber body, each group being arranged in a plane extending longitudinally through its compensating lever parallel with the axis of its hub structure and with their plates arranged lengthwise of their compensating levers, means connecting a first plate of each rubber sandwich of each group to its compensating lever including an upright metal load transfer plate arranged longitudinally of said compensating levers in compartments therein, means connecting the second plate of each rubber sandwich of each group to its corresponding load transfer plate, and means connecting together the upright metal load transfer plates of the two compensating levers.

3. A vehicle spring suspension adapted to be interposed between a vehicle frame and a pair of tandem rubber tired wheels arranged one in advance of the other at at least one side of the frame, and the suspension having a generally horizontal hub structure associated with each wheel and journalled on said frame to extend transversely of the line of vehicle travel, an arm fixed at one end to each hub structure and projecting radially therefrom, a stub axle fixed to each arm remote from its hub structure and forming a journal for the corresponding wheel, and a compensating lever fixed at one end to each hub structure and projecting radially therefrom with the other end of one of said compensating levers being arranged above the other end of the other of said compensating levers; wherein the improvement comprises at least one group of many rectilinear movement shear rubber sandwiches associated with each compensating lever, each sandwich comprising a resilient rubber body and rigid plates bonded to opposite faces of the rubber body, each group being arranged in a plane extending longitudinally through its compensating lever parallel with the axis of its hub structure, load transfer means interposed between said compensating levers, means connecting a first plate of each rubber sandwich of each group to its compensating lever, and means connecting the second plate of each rubber sandwich of each group to said load transfer means.

4. A vehicle spring suspension as set forth in claim 3 wherein said first and second plates of said rubber sandwiches are arranged transversely of their compensating levers.

5. A vehicle spring suspension as set forth in claim 3 wherein said first and second plates of said rubber sandwiches are arranged lengthwise of their compensating levers.

6. A vehicle spring suspension as set forth in claim 3 wherein two such groups of many shear rubber sandwiches are associated with each compensating lever, and said connecting means includes a member extending lengthwise of each compensating lever and connected to the second plates of the two groups of rubber sandwiches thereof, and means connecting together such members of both compensating levers.

7. A vehicle spring suspension as set forth in claim 3 wherein a compartment is provided in each of the compensating levers at the ends thereof so arranged one above the other, said compartments having open sides facing each other and housing the corresponding group of shear rubber sandwiches.

8. A vehicle spring suspension as set forth in claim 7 wherein each of said compartments is provided by the spaced side plates of the corresponding compensating lever, and upright partitions connecting said side plates.

9. A vehicle spring suspension as set forth in claim 7 wherein said compartments are also open on their sides remote from said first mentioned open sides, whereby said groups of rubber sandwiches are capable of moving through both of said open sides in acting to provide resilient support for said frame on said wheels.

10. A vehicle spring suspension as set forth in claim 9 wherein said first plates of said rubber sandwiches are arranged transversely of their compensating levers and said means connecting such first plates to their compensating lever are fastenings securing them to said partitions.

* * * * *